United States Patent [19]

Hassan et al.

[11] Patent Number: 5,604,806
[45] Date of Patent: Feb. 18, 1997

[54] APPARATUS AND METHOD FOR SECURE RADIO COMMUNICATION

[75] Inventors: Amer A. Hassan, Durham, N.C.; John E. Hershey, Ballston Lake, N.Y.; Sandeep Chennakeshu, Cary, N.C.

[73] Assignee: Ericsson Inc., Research Triangle Park, N.C.

[21] Appl. No.: 376,144

[22] Filed: Jan. 20, 1995

[51] Int. Cl.⁶ .................. H04L 9/08; H04L 9/00
[52] U.S. Cl. .................. 380/44; 380/21; 380/46; 380/48; 380/49
[58] Field of Search .................. 380/21, 44, 46, 380/47, 48, 49, 43

[56] References Cited

U.S. PATENT DOCUMENTS

| | | | |
|---|---|---|---|
| 5,084,669 | 1/1992 | Dent | 324/76.82 |
| 5,151,919 | 9/1992 | Dent | 375/205 |
| 5,161,244 | 11/1992 | Maurer | 380/43 |
| 5,220,275 | 6/1993 | Holmqvist | 324/76.82 |
| 5,243,649 | 9/1993 | Franson | 380/9 |
| 5,307,410 | 4/1994 | Bennett | 380/21 |
| 5,353,352 | 10/1994 | Dent et al. | 380/37 |
| 5,357,454 | 10/1994 | Dent | 364/727 |

FOREIGN PATENT DOCUMENTS

| | | | |
|---|---|---|---|
| 446190 | 9/1991 | European Pat. Off. | H03D 13/00 |
| 457602 | 11/1991 | European Pat. Off. | H04L 5/06 |

OTHER PUBLICATIONS

R. Blahut, *Theory and Practice of Error Control Codes*, chapt. 7, Addison–Wesley, Reading, MA (1983).

W. Diffie et al., "Privacy and Authentication: An Introduction to Cryptography," *Proceedings of the IEEE* vol. 67, No. 3, pp. 397–427 (Mar. 1979).

W. Diffie, "The First Ten Years of Public–Key Cryptography," *Proceedings of the IEEE* vol. 76, No. 5, pp. 560–577 (May 1988).

K. Gilhousen et al., "On the Capacity of a Cellular CDMA System," *IEEE Trans. on Veh. Tech.* vol. 40, No. 2, pp. 303–312 (May 1991).

M. Hellman, "The Mathematics of Public–Key Cryptography", *Scientific American* vol. 234, No. 8, pp. 146–152, 154–157 (Aug. 1979).

W. C. Jakes, Jr., ed., *Microwave Mobile Communications*, chapt. 1, John Wiley and Sons (1974).

R. L. Rivest et al., "A Method for Obtaining digital Signatures and Public–Key Cryptosystems," *Commun. of the ACM* vol. 21, pp. 120–126 (Feb. 1978).

C. E. Shannon, "Communication Theory of Secrecy Systems," *Bell Sys. Tech. J.* vol. 28, pp. 656–715 (Oct. 1949).

*Primary Examiner*—Bernarr E. Gregory
*Attorney, Agent, or Firm*—Burns, Doane, Swecker & Mathis, L.L.P.

[57] ABSTRACT

Characteristics of the radio channel are used to establish key sequences for use in encrypting communicated information. These characteristics are the short-term reciprocity and rapid spatial decorrelation of phase of the radio channel. The keys can be established with computations equivalent to a bounded distance decoding procedure, and the decoder used to establish a key may be used for processing the subsequent data transmission. Compared to classical and public-key systems, an alternative mechanism for establishing and sharing key sequences that depends on a physical process is provided in which each party need not generate a pseudo-random quantity because the necessary randomness is provided by the temporal and spatial non-stationarity of the communication channel itself. By using a channel decoder, the probability of two users establishing the same secret key is substantially unity, and the probability of an eavesdropper establishing the same key is substantially zero. Also, the number of possible keys is large enough that finding the correct one by exhaustive search is impractical.

30 Claims, 7 Drawing Sheets

Fig. 2A

| 6 | 6 | 16 | 28 | 122 | 24 | 122 |
|---|---|----|----|-----|----|----|
| G | R | PREAM | SYNC | DATA | SYNC+ | DATA |

Fig. 2B

| 6 | 6 | 16 | 28 | 122 | 24 | 78 | 44 |
|---|---|----|----|-----|----|----|-----|
| G | R | PREAM | SYNC | DATA | SYNC+ | DATA | AG |

Fig. 2C

| 28 | 3 | 3 | 6 | 130 | 12 | 130 | 3 | 2 | 5 | 2 |
|----|---|---|---|-----|----|-----|---|---|---|---|
| SYNC | BRI | R/N | CPE | DATA | CSFP | DATA | BRI | R/N | CPE | RSVD |

| | | |
|---|---|---|
| AG | = | ABBREVIATED GUARD TIME |
| BRI | = | BUSY/RESERVED/IDLE INDICATOR |
| CSFP | = | CODED SUPER FRAME PHASE |
| DATA | = | INFORMATION BITS |
| G | = | GUARD TIME |
| CPE | = | CODED PARTIAL ECHO |
| PREAM | = | PREAMBLE |
| R | = | RAMP TIME |
| R/N | = | RECEIVED/NOT RECEIVED |
| RSVD | = | RESERVED FIELD, SET TO 11 |
| SYNC | = | SYNCHRONIZATION |
| SYNC+ | = | ADDITIONAL SYNCHRONIZATION |

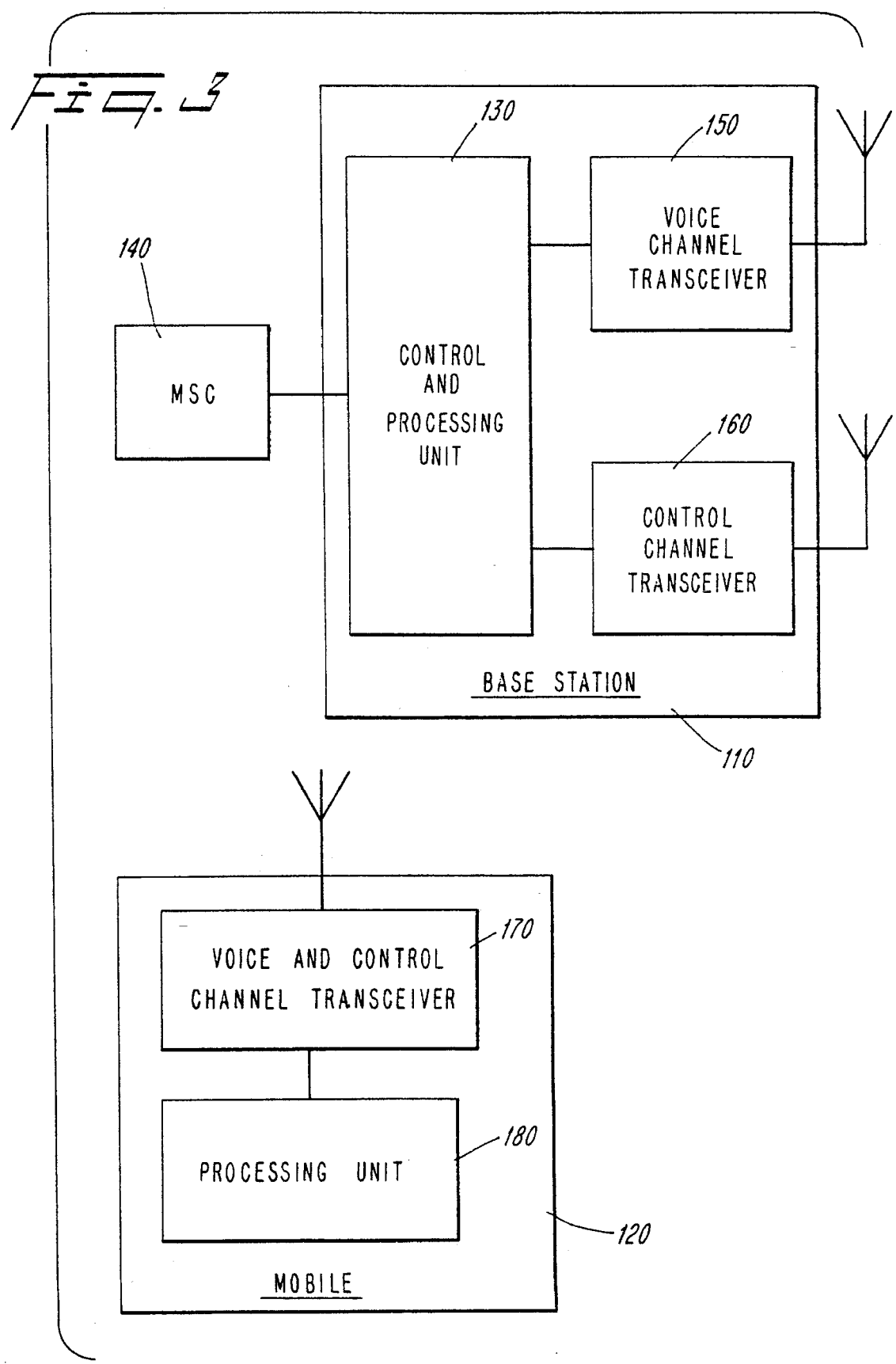

APPARATUS AND METHOD FOR SECURE RADIO COMMUNICATION

BACKGROUND

Applicants' invention relates to apparatus and methods for communicating information securely, which is to say with reduced susceptibility to eavesdropping.

The widespread need for secure communication in radio communication systems is apparent. As just two examples, information relating to financial transactions is routinely exchanged by radio, and law enforcement officers often must communicate voice and/or data by radio. In both examples, it is critical that the communication be conducted with almost perfect secrecy, despite potential eavesdroppers' having access to strong information signals. Users of cellular radiotelephones also desire privacy in their communications, which may travel on links between mobile phones and base stations or on direct links between mobile phones.

One way of providing security is to encrypt the communicated information according to some system that the users have agreed in advance to use. Several encryption methods have been described in the literature, such as the data encryption standard (DES) and public key cryptography (PKC). As explained in W. Diffie et al., "Privacy and Authentication: An Introduction to Cryptography", *Proc. IEEE* vol. 67, pp. 397–427 (Mar. 1979), a classical cryptographic system is in general a set of instructions, a piece of hardware, or a computer program that can convert plaintext (unencrypted information) to ciphertext, or vice versa, in a variety of ways, one of which is selected by a specific key that is known to the users but is kept secret from others. The DES is a classical cryptographic system.

Popular PKC systems make use of the fact that finding large prime numbers is computationally easy but factoring the products of two large prime numbers is computationally difficult. PKC systems have an advantage over other cryptographic systems like the DES in that a PKC system uses a key for decryption (two large prime numbers) that is different from the key for encryption (the product of the two prime numbers, and an associated number). Thus, a PKC user's encryption key can be published for use by others, and the difficulty of securely distributing keys is avoided. See, e.g., R. I. Rivest et al., "A Method of Obtaining Digital Signatures and Public-Key Cryptosystems", *Commun. of the ACM* vol. 21, pp. 120–126 (Feb. 1978); and W. Diffie, "The First Ten Years of Public-Key Cryptography", *Proc. IEEE* vol. 76, pp. 560–577 (May 1988).

For either a classical or PKC system, the security of a message is dependent to a great extent on the length of the key, as described in C. E. Shannon, "Communication Theory of Secrecy Systems", *Bell Sys. Tech. J.* vol. 28, pp. 656–715 (Oct. 1949).

Unfortunately, it is often the case that two users (two police officers, for instance) do not share a secret key a priori, making secure real-time communication via a classical crytographic system impossible. Even a PKC system requires a user to generate a pseudo-random quantity. Moreover, popular PKC systems are unprovably secure, and suffer from severe requirements in computational complexity and amount of information that must be exchanged. As new ways of attacking PKC systems are mounted, PKC systems will retreat to ever longer exchange vectors (in effect, larger prime numbers) and ever more complex computations. As a result, classical and PKC cryptographic systems are less than ideal for many communication situations.

Complicating the task of any radio communication system is the variability of the radio channel caused by atmospheric disturbances, relative motion of the system users, changing radio signal reflections from structures and vehicles, etc. Such channel variability contributes to errors in the information communicated, and much effort is expended to overcome these errors. For example, some cellular radiotelephone systems convert analog information to be transmitted into digital information, which is then transformed according to a block error correction code. Such cellular radio systems are the North American digital advanced mobile phone service (D-AMPS), some of the characteristics of which are specified by the IS-54B and IS-136 standards published by the Electronic Industries Association and Telecommunications Industry Association (EIA/TIA), and the European GSM system.

In such time-division multiple access (TDMA) systems, each radio channel, or radio carrier frequency, is divided into a series of time slots, each of which contains a burst of information from a data source, e.g., a digitally encoded portion of a voice conversation. Successive time slots assigned to the same user, which are usually not consecutive time slots on the radio carrier, constitute the user's digital traffic channel, which may be considered a logical channel assigned to the user. During each time slot, 324 bits may be transmitted, of which the major portion, 260 bits, is due to the speech output of a coder/decoder (codec), including bits due to error correction coding of the speech output. The remaining bits are used for guard times and overhead signalling for purposes such as synchronization.

Other current cellular mobile telephone systems use analog FM to transmit speech. The three principal standards are the AMPS system in the U.S. that uses wideband FM with a spacing between channels of 30 KHz, the TACS system in the United Kingdom that uses 25 KHz channel spacings, and the NMT system in Scandinavia that uses narrow-band FM with 12.5 KHz channel spacings. In an effort to alleviate the capacity restrictions of the current analog FM systems, the D-AMPS and GSM systems, as well as systems in Japan, use digital transmission as described above. Another approach to increasing system capacity by reducing bandwidth requirements is a narrow-band FM system according to the NAMPS specification, which specifies a channel spacing of 10 KHz that is achieved by splitting each 30-KHz channel of AMPS into three parts.

FIGS. 1A, 1B illustrate an exemplary multi-layered cellular system. An umbrella macrocell 10 represented by a hexagonal shape (see FIG. 1A) is part of an overlying cellular structure comprising many macrocells $A_1$–$A_7$, $B_1$–$B_7$ (see FIG. 1B). Each umbrella cell may contain an underlying microcell structure. The radio coverage of the umbrella cell and an underlying microcell may overlap or may be substantially non-overlapping. The umbrella cell 10 includes microcells 20 represented by the area enclosed within the dotted line and microcells 30 represented by the area enclosed within the dashed line corresponding to areas along city streets, and picocells 40, 50, and 60, which cover individual floors of a building.

Briefly, control channels are used for setting up calls, informing the base stations about location and parameters associated with mobile stations, and informing the mobile stations about location and parameters associated with the base stations. The base stations listen for call access requests by mobile stations and the mobile stations in turn listen for paging messages. Once a call access message has been received, it must be determined which cell should be responsible for the call. Generally, this is determined by the signal strength of the mobile station received at the nearby cells. Next, the assigned cell is ordered, by the mobile switching center (MSC) for example, to tune to an available voice channel which is allocated from the set of voice channels accessible to the assigned cell.

FIGS. 2A–2C show exemplary time slot formats on a digital control channel (DCC) according to the IS-136 standard. Two possible formats for information sent from a mobile station to a base station are shown in FIGS. 2A and 2B, and a format for information sent from a base station to a mobile station is shown in FIG. 2C. These formats are substantially the same as the formats used for digital traffic channels (DTCs) under the IS-54B standard, but new functionalities are accorded to the fields in each slot in accordance with U.S. patent application Ser. No. 08/331,703 filed Oct. 31, 1994, which is expressly incorporated here by reference. In FIGS. 2A–2C, the number of bits in each field is indicated above that field. The bits sent in the G, R, PREAM, SYNC, SYNC+, and AG fields are used in a conventional way to help ensure accurate reception of the CSFP and DATA fields, e.g., for synchronization, guard times, etc. For example, the SYNC field would be the same as that of a DTC according to IS-54B and would carry a predetermined bit pattern used by the base stations to find the start of the slot. Also, the SYNC+ field would include a fixed bit pattern to provide additional synchronization information for the base stations, which would set their receiver gains during the PREAM field so as to avoid signal distortion.

FIG. 3 is a block diagram of an exemplary cellular mobile radiotelephone communication system for use with the cellular structure shown in FIGS. 1A, 1B and the time slot formats shown in FIGS. 2A–2C. The communication system includes a base station 110 that is associated with a respective one of the macrocell, microcell, and picocell; a mobile station 120; and an MSC 140. Each base station has a control and processing unit 130, which communicates with the MSC 140, which in turn is connected to the public switched telephone network (not shown). Each base station also includes at least one voice channel transceiver 150 and a control channel transceiver 160, which are controlled by the control and processing unit 130. The mobile station 170 includes a similar voice and control channel transceiver 170 for exchanging information with the transceivers 150, 160, and a similar control and processing unit 180 for controlling the voice and control channel transceiver 170. The mobile station's transceiver 170 can also exchange information with the transceiver 170 in another mobile station.

Other approaches to communication use systems called code division multiplexing (CDM) and code division multiple access (CDMA). In a conventional CDMA system, a digital information sequence to be communicated is spread, or mapped, into a longer digital sequence by combining the information sequence with a spreading sequence. As a result, one or more bits of the information sequence are represented by a sequence of N "chip" values. In one form of this process, called "direct spreading", each spread symbol is essentially the product of an information symbol and the spreading sequence. In a second form of spreading called "indirect spreading", the different possible information symbols are replaced by different, not necessarily related, spreading sequences. It will be understood that the information symbols may be produced by preceding stages of channel coding and/or spreading.

An advantage of such spreading is that information from many sources can be transmitted at the same time in the same frequency band, provided the spreading sequences used to represent the different sources' information sequences do not interfere with one another too much. In effect, the different spreading sequences correspond to different communication "channels". In general, there are $2^N$ possible binary spreading sequences of length N chips, which results in a very large number of possible CDMA channels. This property of a CDMA system is sometimes called "soft capacity" because the number of channels is not restricted to N, as it would be in a frequency-division multiple access (FDMA) or a time-division multiple access (TDMA) system of the same bandwidth and data rate. Various aspects of conventional CDMA communications are described in K. Gilhousen et al., "On the Capacity of a Cellular CDMA System," IEEE Trans. Veh. Technol. vol. 40, pp. 303–312 (May 1991); and the following U.S. patent documents that are expressly incorporated here by reference: U.S. Pat. No. 5,151,919 to Dent; and U.S. Pat. No. 5,353,352 to Dent et al.; and U.S. patent application Ser. No. 08/155,557 filed Nov. 22, 1993, now U.S. Pat. No. 5,506,861.

SUMMARY

In accordance with Applicants' invention, characteristics of the radio channel are used to establish and exchange cryptographic keys with almost perfect secrecy. These characteristics are the short-term reciprocity and rapid spatial decorrelation of phase of the radio channel. In other words, for a short period of time (on the order of a few milliseconds), the impulse response of a radio channel viewed from an antenna located at a position A to an antenna located at a position B is the same as the impulse response of the channel viewed from position B to position A, excluding thermal noise. The keys can be established with computations equivalent to a bounded distance decoding procedure, and the decoder used to establish a key may be used for processing the subsequent data transmission.

Thus, compared to classical and PKC cryptographic systems, Applicants' invention provides an alternative mechanism for establishing and sharing cryptographic keys that depends on a physical process. With Applicants' system, there is no need for each party to generate a pseudorandom quantity because the necessary randomness is provided by the temporal and spatial non-stationarity of the communication channel itself. By using a channel decoder, the probability of two users establishing the same secret key is close to one, and the probability of an eavesdropper establishing the same key is essentially zero. This is called "probabilistic secrecy". Also, the number of possible keys is large enough that finding the correct one by exhaustive search is impractical. This is called "computational secrecy". These probabilistic measures are different from the Shannon measure of perfect secrecy.

In one aspect, Applicants' invention provides a method of establishing a key sequence for secure communication between a first radio transceiver and a second radio transceiver comprising the steps of, in the first radio transceiver, transmitting a plurality of sinusoidal signals, each sinusoidal signal having a respective predetermined frequency and a predetermined initial phase; and in the second radio transceiver, detecting the plurality of sinusoidal signals transmitted by the first radio transceiver, and transmitting the plurality of sinusoidal signals after a predetermined time period. This method further includes, in each of the first and second radio transceivers, the steps of determining differences between the phases of pairs of the plurality of sinusoidal signals received from the other radio transceiver; quantizing each difference into a respective one of a plurality of phase decision values; and decoding a plurality of the quantized differences into a key sequence according to a predetermined block code.

The method may further include the step of determining a magnitude of each of the plurality of sinusoidal signals, wherein the magnitudes are used in the decoding step as soft information. Also, the method may further include, in at least one of the first and second radio transceivers, the step of encrypting information to be transmitted according to the key sequence; and in at least the other one of the first and second radio transceivers, the step of decrypting encrypted transmitted information according to the key sequence.

In another aspect, Applicants' invention provides a method of establishing a key sequence for secure communication between a first radio transceiver and a second radio transceiver comprising the steps of, in the first radio transceiver, transmitting a predetermined digital word including a plurality of bits; and in the second radio transceiver, detecting the predetermined digital word transmitted by the first radio transceiver, and transmitting the predetermined digital word after a predetermined time period. This method further includes, in each of the first and second radio transceivers, hard-decision decoding each of the plurality of bits in the predetermined digital word received from the other radio transceiver; and mapping the hard-decision decoded plurality of bits into a key sequence according to a predetermined block code.

In yet another aspect, Applicants' invention provides a method of establishing a key sequence for secure communication between a first radio transceiver and a second radio transceiver comprising the steps of, in the first radio transceiver, transmitting a predetermined digital word including a plurality of bits; and in the second radio transceiver, detecting the predetermined digital word transmitted by the first radio transceiver, and transmitting the predetermined digital word after a predetermined time period. This method further includes, in each of the first and second radio transceivers, the steps of determining a phase of each of the plurality of bits received from the other radio transceiver; determining a difference between each phase determined and a respective predetermined phase; quantizing each difference into a respective one of a plurality of phase decision values; and decoding a plurality of the quantized differences into a key sequence according to a predetermined block code.

In various other aspects, Applicants' invention provides several apparatus for establishing a key sequence for secure communication between a first radio transceiver and a second radio transceiver.

BRIEF DESCRIPTION OF THE DRAWINGS

Applicants' invention is described below in more detail with reference to embodiments that are given only by way of example and that are illustrated in the accompanying drawings, in which:

FIGS. 2A–2C show exemplary time slot formats;

FIG. 3 is a block diagram of an exemplary cellular mobile radiotelephone system;

DETAILED DESCRIPTION

While the following description is in the context of cellular communication systems involving portable or mobile radiotelephones and/or personal communication networks, it will be understood by those skilled in the art that Applicants' invention may be applied to other communication applications.

SYSTEM OVERVIEW

Consider the n-dimensional vector space consisting of all vectors having elements that are contained in the Galois field $GF(M=2^m)$, viz., all $r=(r_1, r_2, \ldots, r_n)$ where $r_i \epsilon\ GF(M=2^m)$. (In the following, vector quantities, or sequences, are indicated by bold type and scalar quantities and functions are indicated by plain type.) For some Hamming radius t, the $M^n$ vectors r are t-sphere packed into S spheres, viz., the maximum number of disjoint spheres having radii t is S. The vectors in a sphere are mapped into a representative consisting of the center of that sphere. Let the set of S representatives be $\{c_1, c_2, \ldots, c_s\}$. Each representative vector $c_i$ has a length n and can be mapped into a binary vector k having a length mn. Let the set of corresponding binary vectors be $K=\{k_1, k_2, \ldots, k_s\}$.

If a transmitter and a receiver can establish, with high probability, a common sequence $k_i$ that is contained in the set K, then the sequence $k_i$ can be used for spreading an information sequence communicated from the transmitter to the receiver. In addition, if the probability is substantially zero that an eavesdropper can determine that common sequence $k_i$, then secure communication is also achieved— without incorporating an extra encryption and decryption algorithm to achieve cryptographic security.

The spheres constructed in accordance with Applicants' invention increase the probability of the transmitter's and receiver's establishing such a common sequence $k_i$ in the event of noise and other discrepancies in the radio channel and system hardware. In general, the transmitter establishes a sequence $r_T$ and the receiver establishes a different sequence $r_R$. If the sequences $r_T$, $r_R$ fall within the same sphere, they will be mapped into the same sequence k in the set K.

Thus, Applicants' invention provides methods and apparatus for establishing two sequences, one at a transmitter and another at a receiver, such that with high probability the two sequences fall within the same sphere. Moreover, the rare event that the two sequences are not in the same sphere is quickly detectable, enabling the procedure for establishing a common sequence to be repeated. The sphere associated with an arbitrary vector is determined efficiently in real time and with low hardware complexity.

SEQUENCE ESTABLISHMENT

Figure 4:
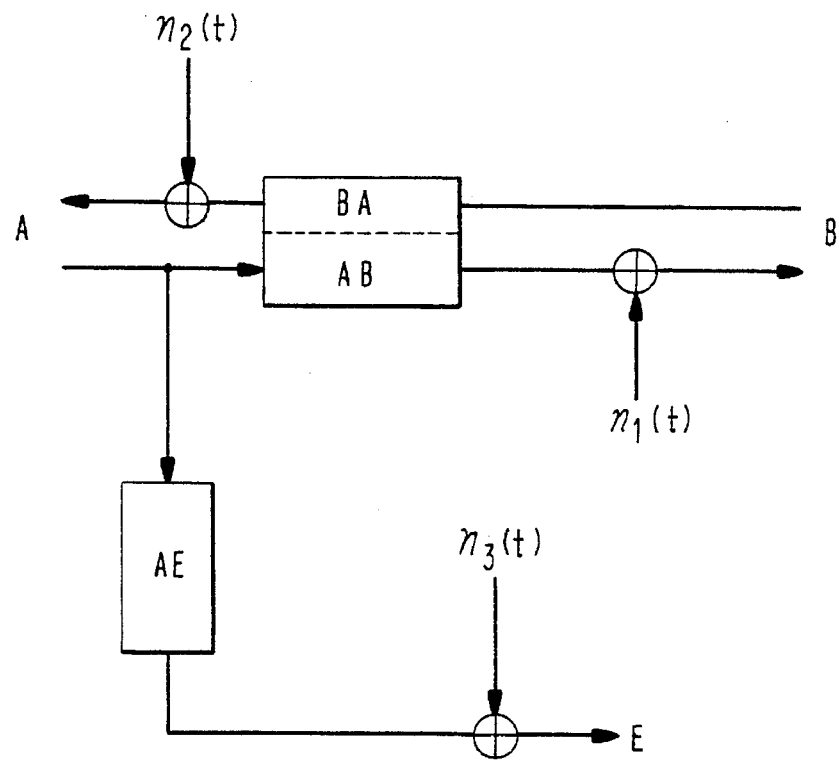
FIG. 4 is a block diagram illustrating a communication system.

A generalized communication link comprises two communication channels: a channel from a first user's transmitter to a second user's receiver, and a channel from the second user's transmitter to the first user's receiver. One can consider the link to include a third channel to an eavesdropper desiring access to the information exchanged by the first and second users. This simple scenario is depicted in FIG. 4, which shows a first user A, a second user B, and an eavesdropper E. In general, the characteristics of the AB channel, the BA channel, and the AE channel all vary with time. Thermal noise in each of the channels is represented by the additive noise terms $n_i(t)$, i=1, 2, 3.

Although they vary with time, the impulse response of the A-B channel is the same as the impulse response of B-A channel excluding thermal noise, which is to say that over short periods of time, on the order of a few milliseconds, the link is reciprocal. It will be understood that the link is not reciprocal when thermal noise (and other possible nonidealities) are included.

Also, it is important to understand that the impulse responses of the A-B channel and B-A channel are different from the impulse responses of the first-user-eavesdropper A-E channel and the second-user-eavesdropper B-E channel. These differences arise because signal phase decorrelates rapidly with changing spatial position.

Two methods of establishing a key sequence are described below.

COMB OF TONES

The immediately following description involves transmission of two tones at a time, but it will be appreciated that more than two tones can be transmitted at a time as described later.

Figures 1A, 1B:
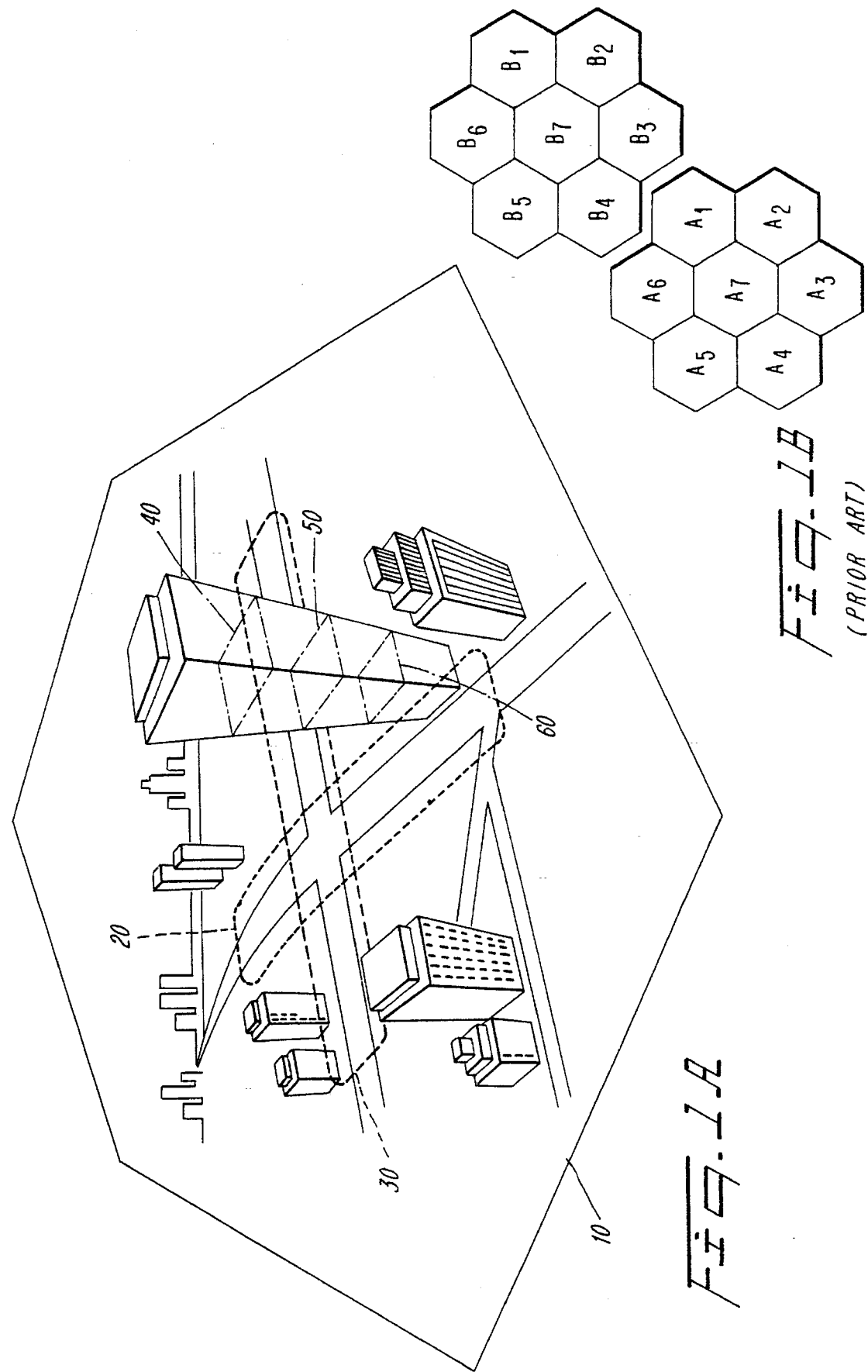
FIGS. 1A, 1B illustrate an exemplary multi-layered cellular system.
Figure 5:
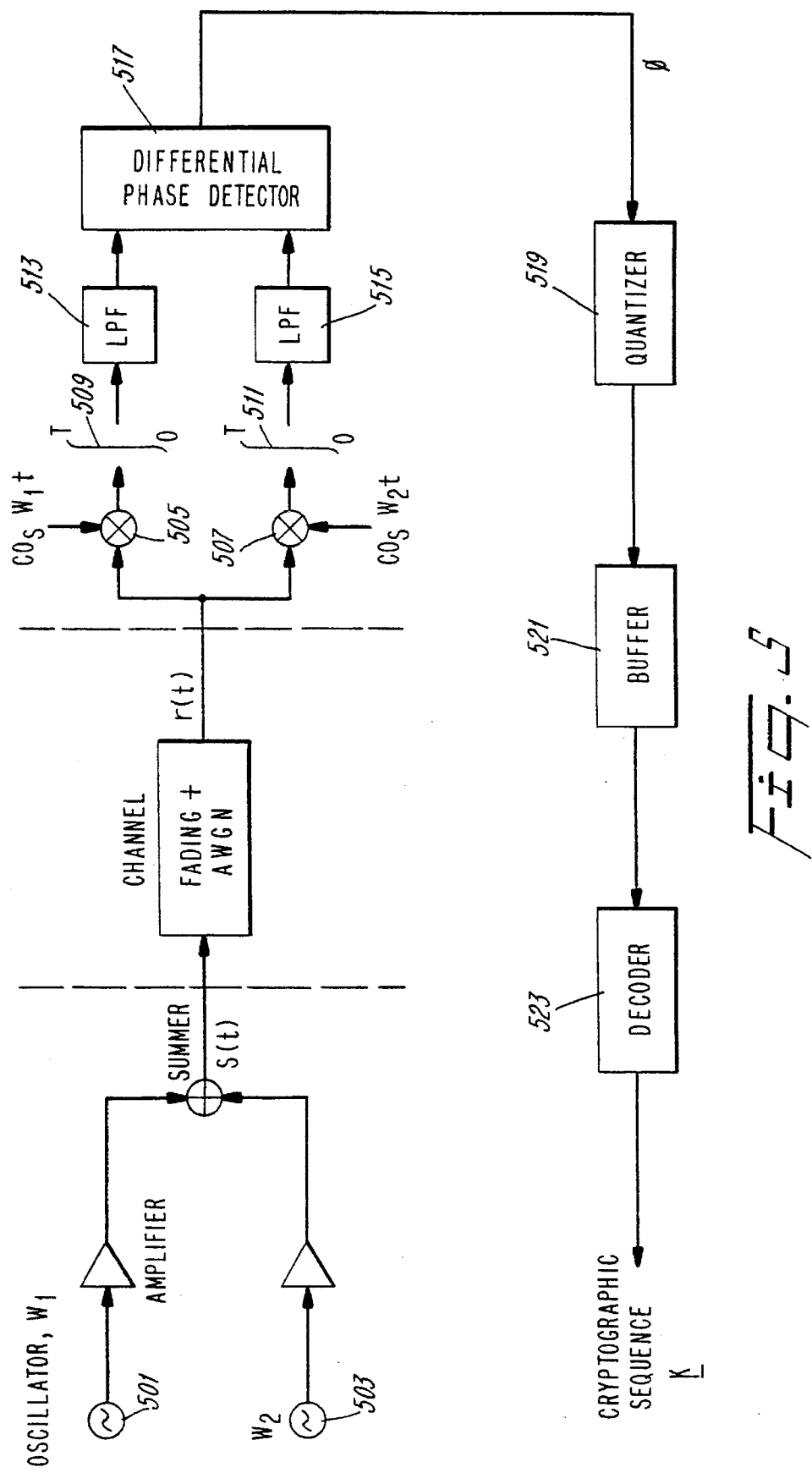
FIG. 5 is a block diagram illustrating a communication system using a comb of tones for establishing a key sequence.

Referring to FIG. 5, suppose a first transceiver such as the first user A transmits a signal s(t) comprising two sinusoids having frequencies $f_1$ and $f_2$ and having equal initial phase offsets $\phi$ and energies E during a k-th signaling interval [kT, (k+1)T]. The transmitted signal s(t) can be generated in any of a number of ways, e.g., by amplifying and summing the output signals of two suitable oscillators 501, 503 or a frequency synthesizer, and upconverting the result to a suitable transmission frequency by modulating a carrier signal. Ignoring the modulation, the transmitted signal s(t) is given by the following expression:

$$s(t) = \sqrt{2E/T} \cos(2\pi f_1 t + \phi) + \sqrt{2E/T} \cos(2\pi f_2 t + \phi) \quad \text{Eq. 1}$$

In general, the transmitted signal s(t) is radiated by an antenna and passes through a channel such as the air, which modifies the transmitted signal by introducing time-varying fading due to multipath propagation and by adding white Gaussian noise n(t) having double-sided power spectral density $N_0/2$.

The receiver downconverts and amplifies the signal that it obtains from the channel (the downconverter and amplifier are not shown in FIG. 5), and correlates the resulting signal r(t) with its own locally generated versions of $\cos(2\pi f_1 t)$ and $\cos(2\pi f_2 t)$. As shown in FIG. 5, each correlation can be carried out by a suitable mixer 505, 507 and a resettable integrator 509, 511, which integrates the mixer's output signal during successive time intervals $T=1/2\pi f_i$, although many other devices that are known to those of ordinary skill in this art can be used. The output signals generated by the correlators are conventionally filtered by low-pass filters 513, 515 for suppressing the sum (up-converted) signals, as well as components that might be due to nearby radio signals.

Assuming the sinusoids $\cos(2\pi f_1 t)$ and $\cos(2\pi f_2 t)$ are orthogonal and separated by at least the coherence bandwidth of the channel, the signal r(t) received by a second transceiver such as the second user B during the k-th signaling interval is given by the following expression:

$$r(t) = \sqrt{2\Lambda_1^2(k)E/T} \cos(2\pi f_1 t + \Theta_1(k)) +$$

$$\sqrt{2\Lambda_2^2(k)E/T} \cos(2\pi f_2 t + \Theta_2(k)) + n(t)$$

where the amplitude coefficients $\Lambda_i(k)$, i=1, 2, are independent, identically distributed random variables.

For a channel suffering Rayleigh-distributed fading, the variables $\Lambda_i(k)$ have Rayleigh probability densities given by the following expression:

$$p_\Lambda(\lambda_i) = \begin{cases} \dfrac{\lambda_i}{\sigma^2} \exp\left(-\dfrac{\lambda_i^2}{2\sigma^2}\right), & \text{for } \lambda_i \geq 0 \\ 0, & \text{for } \lambda_i < 0 \end{cases} \quad \text{Eq. 2}$$

where $\sigma^2 = E\{\Lambda_i^2(k)\}$ is a characteristic of the channel and $E\{.\}$ denotes expectation with respect to $P_\Lambda$. The phase terms $\theta_1(k)$ and $\theta_2(k)$ are mutually independent random variables, and each has a probability density that is uniform over the interval $[-\pi, \pi]$.

Similar expressions for the received signal r(t) can be developed for communication channels having other characteristics, such as Rician-distributed fading. For example, the probability densities for a Rician-distributed channel are given by the following expression:

$$p_\Lambda(\lambda_i) = \quad \text{Eq. 3}$$

$$\begin{cases} \dfrac{\lambda_i}{\sigma^2} \exp\left(-\dfrac{\lambda_i^2 + s^2}{2\sigma^2}\right) \cdot I_0\left(\dfrac{\lambda_i s}{\sigma^2}\right), & \text{for } \lambda_i \geq 0 \\ 0, & \text{for } \lambda_i < 0 \end{cases}$$

where $I_0(.)$ is the modified Bessel function of zero order, and $s^2$ is the power of a direct line-of-sight component.

In the transceiver of the second user B, the filtered correlator output signals are provided to a differential phase detector 517, which generates, for each time interval T, an estimate of the difference between the phase terms $\theta_1(k)$ and $\theta_2(k)$. The successive phase-difference estimates are provided to a quantizer 519, which allocates a respective one of a number of predetermined phase values to each phase-difference estimate. In accordance with Applicants' invention, it is only necessary that the phase-difference estimates for different time intervals be uncorrelated with each other. (In the following, the time index k will be dropped when it results in no ambiguity.)

Figure 6:
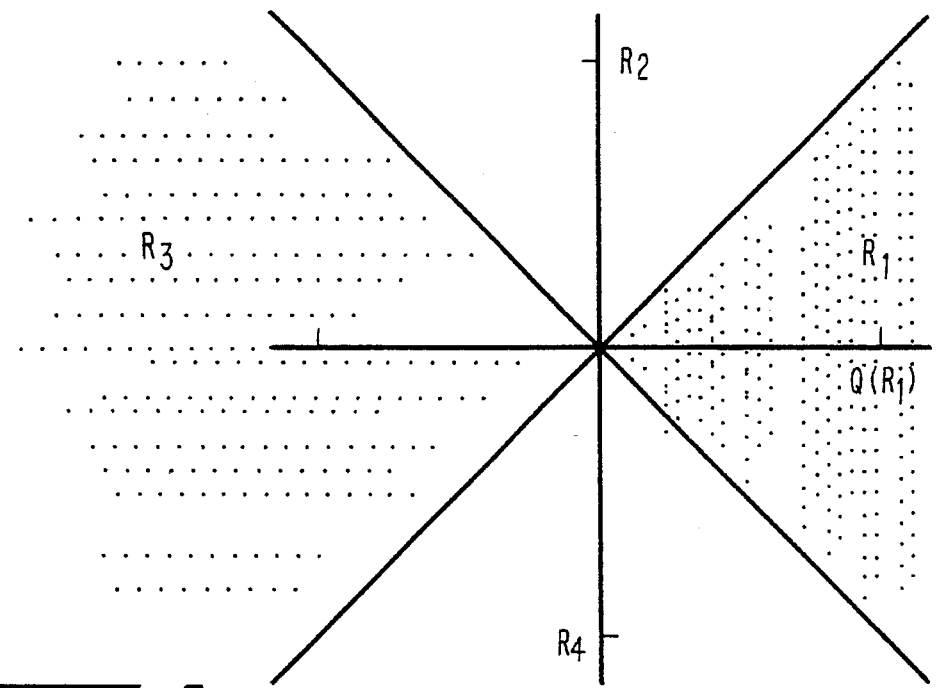
FIG. 6 shows phase-space decision regions.

The baseband differential signal generated by the differential phase detector 517 in the receiver B is given by the following expression:

$$U_B = 2\Lambda_1\Lambda_2 E \exp[j(\Theta_1 - \Theta_2)] + \Lambda_1 N_1 + \Lambda_2 N_2^* \quad \text{Eq. 4}$$
$$= X_B + jY_B$$

where $N_1$ and $N_2$ are complex-valued Gaussian random variables having zero means and variances $\sigma^2 = 2EN_0$, and "*" denotes conjugation. The phase-difference estimate is given by $\Phi^B = \tan^{-1} Y_B/X_B$. As noted above, the second user B quantizes the phase-difference estimate into one of M predetermined phase values, generating a quantizer output signal $Q(\Phi^B)$. FIG. 6 illustrates phase-space decision regions for M=4.

The differential phase detector or phase measuring device 517 may produce either an analog or a digital measurement of the baseband signal's instantaneous phase. A suitable differential detector is a combination of two of the phase detectors described in U.S. Pat. Nos. 5,084,669 to Dent and U.S. Pat. Nos. 5,220,275 to Holmqvist, both of which are expressly incorporated here by reference.

By repeating the above estimation-quantization process at each of times k=1, 2, ..., n, the second user B establishes a sequence of quantized phase-difference estimates that is given by the following expression:

$$r^B = [Q(\Phi_2^B), \ldots, Q(\Phi_n^B)]. \quad \text{Eq. 5}$$

This sequence $r_B$ of phase values generated by the quantizer 519 is stored in a buffer 521, such as a random-access memory, a shift register, or equivalent device, which has a length that is determined by parameters of a minimum distance, error correction decoder 523. The error correction decoder 523 in the receiver B transforms the sequence of quantized phase-difference estimates and generates an output signal that corresponds to the receiver's key sequence $k_B$.

In effect, the size of the buffer 521 is determined by the length of the key sequence desired. If the decoder 523 has a block length N and dimensionality k, then the buffer delay is N for this example in which the comb consists of only two tones simultaneously transmitted at each of N times. As described below, more than two tones can be simultaneously transmitted, which reduces the buffer delay accordingly. For example, if T tones are simultaneously transmitted, T-1 phase differences can be quantized at once, and the buffer delay is N/(T-1).

The vector $r_B$ generated by the buffer 521 has N elements, each of which is M-ary, and this N-element vector is the input to any of a wide variety of minimum distance decoders 523. One useful decoder is the bounded distance decoder, which is a low-complexity decoder described in R. Blahut, *Theory and Practice of Error Control Codes*, chapt. 7, Addison-Wesley, Reading, Mass. (1983). The decoder 523 maps the N symbols generated by the buffer to another N symbols, which is the cryptographic key sequence $k_B$ of interest, as described in more detail below.

It will be appreciated that the signal processing operations carried out in the receiver can be performed in the digital domain by a suitable digital signal processing (DSP) device. With such a configuration, almost any type of modulation can be detected by programming the DSP device to appropriately manipulate digital samples of the received signal, as described for example in U.S. patent application Ser. No. 07/967,027 to Dent et al. for "Multi-Mode Signal Processing", filed Oct. 22, 1992, which is expressly incorporated here by reference. It will be appreciated that the DSP device may be implemented as hard-wired logic circuitry, or, preferably, as an integrated digital signal processor, such as an application-specific integrated circuit (ASIC). Of course it will be understood that an ASIC may include hard-wired logic circuitry that is optimal for performing a required function, which is an arrangement commonly selected when speed or another performance parameter is more important than the versatility of a programmable digital signal processor.

In a manner and with hardware similar to that described above, the first user A establishes its own sequence of quantized phase-difference estimates from a signal transmitted by the second user B. With a delay after transmission by the first user that is negligible, i.e., a delay that is small in comparison to the channel's coherence bandwidth, the second user B transmits a signal-comprising the two sinusoids having the frequencies $f_1$ and $f_2$ and equal phase offsets and energies. In other words, the first user A transmits, then the second user B, then the first user A, and so on in an interleaved manner in order to maintain the reciprocity assumption.

Suppose the first user A is a radiotelephone moving at a speed of 100 km/hr with respect to a base station or other transceiver (the second user B) and using a radio frequency carrier in the 900 MHz region. If the delay between the transmissions by the first user and the transmissions by the second user is 10 μsec, the radiotelephone would move only 0.28 mm during each delay, a distance that is negligible in comparison to the wavelength of 0.3 m. Thus, the scatterings of the signal from the various reflectors should be strongly correlated. Also, a 10- μsec delay is longer than the time usually needed to permit all signal rays due to multipath propagation to arrive at the second user and shorter than the few milliseconds needed to ensure the reciprocity of the channel. If the motion is slower or the delay is shorter, the reciprocity of the channel is even more precise.

Thus, the first user A forms a baseband differential signal (the output of its own differential phase detector) given by the following expression:

$$\begin{aligned}U_A &= 2\Lambda_1\Lambda_2 E \exp[j(\Theta_1 - \Theta_2)] + \Lambda_1 V_1 + \Lambda_2 V_2^* \quad \text{Eq. 6}\\&= X_A + jY_A\end{aligned}$$

where $V_1$ and $V_2$ are independent of $N_1$ and $N_2$. The estimated phase difference generated by the first user A is $\Phi^A = \tan^{-1} Y_A/X_A$. It will be observed that, due to the reciprocity of the channel, the only difference between $U_A$ and $U_B$ is the additive Gaussian noises.

By successively repeating the estimation-quantization process, the first user A establishes a sequence of phase-difference estimates that is given by the following expression:

$$r_A = [Q(\Phi_1^A), Q(\Phi_2^A), \ldots, Q(\Phi_n^A)]. \quad \text{Eq. 7}$$

which is the sequence stored in a buffer in the first user's transceiver and provided to a corresponding error correction decoder in that first transceiver.

From these transmitted signals, the eavesdropper E can obtain a baseband differential signal given by the following expression:

$$\begin{aligned}U_E &= 2\Lambda_3\Lambda_4 E \exp[j(\Theta_3 - \Theta_4)] + \Lambda_3 V_3 + \Lambda_4 V_4^* \quad \text{Eq. 8}\\&= X_E + jY_E\end{aligned}$$

where the $\Lambda_i$, i=1, 2, 3, 4, are mutually independent. The eavesdropper's estimated phase difference is $\Phi_E = \tan^{-1} Y_E/X_E$. Also, the $\theta_i$, i=1, 2, 3, 4, are mutually independent random variables. The eavesdropper E can establish a sequence of phase-difference estimates given by the following expression:

$$r_E = [Q(\Phi_1^E), Q(\Phi_2^E), \ldots, Q(\Phi_N^E)] \quad \text{Eq. 9}$$

As noted above, each of the three sequences or vectors $r_A$, $r_B$, and $r_E$ that is established is provided as an input signal to a respective error correction decoder. The output signals generated by the decoders correspond to the key sequences $k_A$, $k_B$, $k_E$. It will be noted that no encrypting need be performed at the transmitters A, B. The decoders limit the number of possible keys to increase the probability of the first user's and second user's establishing the same key as described in more detail below.

To explain why the tones $f_1$, $f_2$ must have frequencies that are sufficiently separated so that their phases are independent, let $$\psi \Delta(\theta_1-\theta_2)-(\theta_3-\theta_4). \quad \text{Eq. 10}$$

and define $$g(x) = \frac{1-\alpha^2}{4\pi^2} \frac{\sqrt{1-\alpha^2\cos^2 x} + \alpha\cos x \cos^{-1}(-\alpha\cos x)}{(1-\alpha^2\cos^2 x)^{3/2}} \quad \text{Eq. 11}$$

where $\alpha^2=J_0^2(\omega_D\tau)/[1+(\omega_1-\omega_2)^2\sigma^2]$; $J_0$ is the Bessel function of order 0; $\omega_D$ is the Doppler frequency shift due to relative motion between the transmitter and receiver; $\tau$ is the transmission time delay; and $\sigma$ is a time delay spread between the multipath signal rays. Then, as explained in W. C. Jakes, Jr., ed., *Microwave Mobile Connnunications* chapt. 1, John Wiley and Sons (1974), $\Psi$ is a random variable having a probability density function given by the following expression:

$$p_\psi(\psi)=4\pi^2\int_0^\pi g(x)[g(x+\psi)+g(x-\psi)]dx \quad \text{Eq. 12}$$

Figure 7:
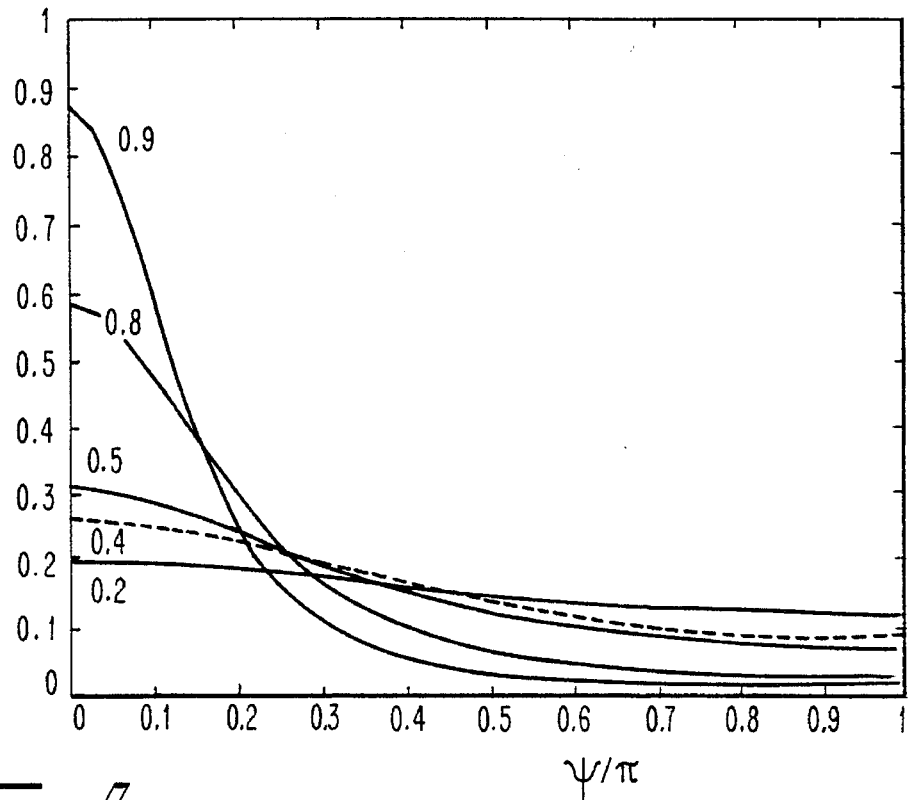
FIG. 7 shows probability density functions of the random variable $\psi$.

FIG. 7 shows the probability density function $P_\Psi$ as a function of $\psi/\pi$ for five different values of the parameter $\alpha^2$. For a frequency separation $(\omega_1-\omega_2)$ of 40 KHz and a time delay spread a of 5 μsec (i.e., $\alpha^2<0.4$, even for the worst case that $\omega_D\tau=0$), the random variable $\psi$ is almost uniformly distributed. In this case, the quantizers quantize the phase-difference estimates into each of the M phase values with equal probability 1/M. The security of the system depends on the degree to which the phases of the tones are decorrelated by passage through the communication channel. If the decorrelation is substantially complete, then the amount of work an eavesdropper must do to break the system approaches that of an exhaustive search for the key sequences $k_A$, $k_B$.

It will be appreciated that the preceding analysis was simplified by letting the two tones have equal energies and equal initial phase offsets, which are easy to obtain with a phase-locked loop for example. In general, it is only necessary for these parameters to be predetermined, viz., known a priori to both transceivers, but such a system is more complicated than that described above.

Also, the preceding analysis considered only two tones transmitted at any one time, but in general, the comb could consist of more than two simultaneously transmitted tones and the preceding analysis would apply to successive pairs of such a comb of tones. In fact, the sequences $r_A$, $r_B$ could be generated all at once by simultaneously transmitting a comb of the appropriate number of tones, and estimating and quantizing the phase difference of each successive pair of tones. Simultaneous transmission of the two or more tones is desirable because it is easy then to control the initial phases of the tones, leading to a less complicated system.

Moreover, it is not necessary that the frequency separation between the tones in one pair of tones be the same as the frequency separation between another pair; in other words, the "comb" can have unevenly spaced "teeth". Also, it is not necessary to consider only pairs of successive tones; in other words, the "teeth" in a pair can be separated by other "teeth". For example, if the comb includes ten tones $f_1, f_2, \ldots f_{10}$ arranged in order of increasing frequency, the necessary uniform distribution of the random variable $\psi$ (see Eq. 12) could be obtained by pairing, say, the tones $f_1$ and $f_4$; $f_2$ and $f_5$; $f_3$ and $f_6$; etc. It is only necessary for the tones in each pair to be orthogonally spaced, i.e., the frequency separations must be sufficient as described above.

PILOT SYMBOLS

Instead of transmitting a comb of sinusoids as described above, the key sequences $k_A$, $k_B$ can be established based on only a plurality of pilot symbols such as the bits that may be transmitted for synchronizing the operation of a first transceiver and a second transceiver. Such sync bits are typically included in conventional cellular radiotelephone systems as described above in connection with FIGS. 2A–2C. Two ways of establishing the keys based on the pilot symbols are described below.

A sequence k can be crudely established by hard-decision decoding the pilot symbols and mapping the resulting sequence of decoded pilot symbols to the center of a sphere. It is believed that any errors in the sequence decoded by the first user will be the same as errors in the sequence decoded by the second user. Thus, the two pilot symbol sequences will be mapped to the same sphere and yield the same key. Even if the errors in the sequences decoded by the first and second users are slightly different, the two sequences will still be mapped to the same sphere with high probability, yielding the same key. A possible shortcoming of this method is that many pilot symbols are needed to make it computationally difficult for an eavesdropper to exhaust all possibilities. If the pilot symbols are the sync bits in a cellular radio telephone system, it is currently believed that at least sixty bits are needed.

It will be appreciated that the necessary pilot symbols need not be transmitted together, viz., it is not necessary to use all of the sync bits in one time slot of a TDMA channel. For example, any one or more of the sync bits in one time slot can be used with any one or more of the sync bits in other time slots. It is only necessary that the time slots be separated by a time interval that is longer than the coherence time of the channel as described above.

A more refined method of establishing a key sequence based on the pilot symbols uses channel state information rather than hard-decision decoding. In this method, the first and second users interpolate known pilot symbols and quantize the outputs of the interpolators in a manner similar to that described above with respect to the method of establishing the key based on a comb of tones.

For example, after downconverting, amplifying, and filtering the received signal as necessary, the second user determines a phase estimate for each of the bits in the sync portion of a time slot. Of course, the first and second users could agree to use another set of known bits. The second user determines the differences between each of the phase estimates and the respective predetermined phases for the known bits. These phase-difference estimates are then quantized and provided to a minimum distance decoder as described above in connection with key establishment by transmitting a comb of tones.

Figure 8:
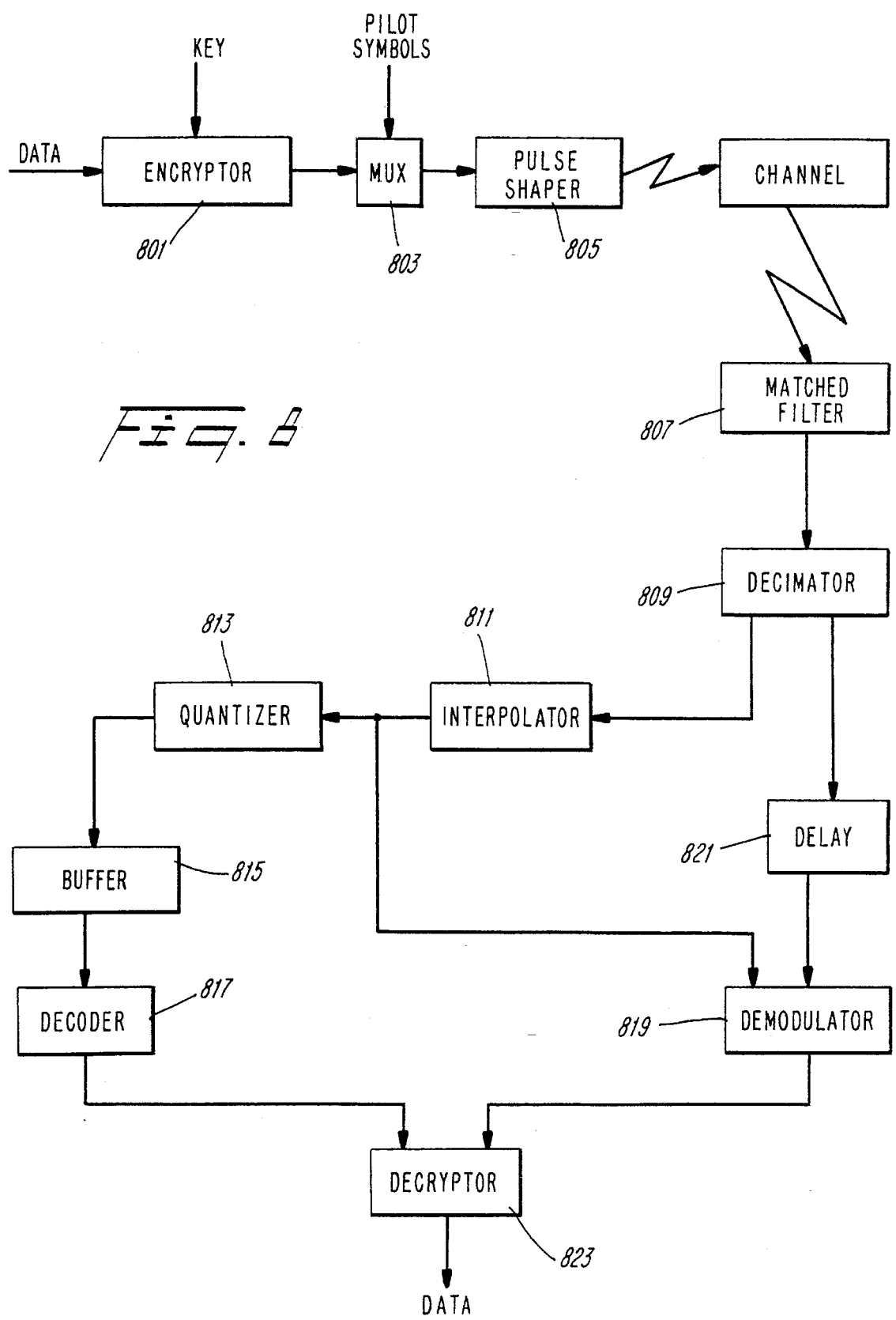
FIG. 8 is a block diagram of a communication system using pilot symbols for establishing a key sequence.

FIG. 8 is a block diagram of a system for carrying out this "refined method" of using pilot symbols. In a first transceiver, data to be transmitted is encrypted according to a key sequence by an encryptor 801. Of course, before the key sequence has been established, the encryptor would simply pass the data to be transmitted without alteration. A multiplexer 803 combines the encrypted data to be transmitted with the known pilot symbols, which may be bits used for synchronization and overhead signaling in conventional radiotelephony. It is only necessary for the pilot symbols to be transmitted with known phases. The sequence of interleaved data and pilot symbols formed by the multiplexer 803 is provided to a pulse shaper and up-converter 805 for transmitting the information through the communication channel, which in general is characterized by fading and additive white gaussian noise.

At the receiving second transceiver, the signal received from the channel is down-converted as necessary and passed through a matched filter 807. The signal generated by the matched filter 807 is divided by a suitably controlled switch 809, or decimator, into a signal comprising the received data that was transmitted and a signal comprising the received pilot symbols. An interpolator 811 measures the phases of the received pilot symbols and forms the difference between each measured phase, which generally will have been rotated by channel fading, and the known transmitted phase of the respective pilot symbol. The interpolator 811 preferably low-pass filters these phase-difference estimates. The phase difference values generated by the interpolator 811 are quantized by a quantizer 813, stored in a buffer memory 815 if necessary for accumulating enough phase difference values, and then decoded by a decoder 817 for generating a key sequence as described above in relation to FIG. 5.

The phase difference values generated by the interpolator 811 are also provided to a demodulator 819 such as an error correction decoder for recovering the data that was transmitted. The demodulator 819 also receives the data that was transmitted, which may have passed through a delay device 821 suitable for synchronizing the phase difference values and the data that was transmitted. Assuming that received data was encrypted according to the key sequence before transmission, the encrypted transmitted data produced by the demodulator 819 and the key sequence produced by the decoder 817 are provided to a decryptor 823 for recovering the data transmitted.

In a manner and with hardware similar to that described above, the transmitter establishes its own key sequence based on transmissions from the receiver, and that key sequence can be used to decrypt encrypted transmissions from the receiver.

SPHERE PACKING AND ASSOCIATION

Assuming that K is given and the spheres are predetermined, the general problem of mapping an arbitrary sequence to a sphere is NP-hard, viz., the computational complexity of the problem is proportional to the number of possible spheres. For this application of secure transmission and spreading, the number of spheres is prohibitively large. Nevertheless, imposing a simplifying structure on the candidate sequences k (corresponding to the representatives c of the spheres) serves to reduce the computational complexity to an acceptable level.

In accordance with Applicants' invention, the set of candidate sequences is limited to the set of sequences of a linear block error correcting code. The radii of the spheres are then determined by such a code's error correcting capability, i.e., the number of errors that the code can correct, and the received sequences r can be mapped to the candidate sequences k by an appropriate known decoding procedure.

As one specific example, linear Bose-Chaudhuri-Hocquenghem (BCH) codes can be used as the set of candidate sequences k; such codes can be decoded with low complexity using either the Peterson-Gorenstein-Zierler procedure or the Berlekamp-Massey procedure, or any procedure for decoding cyclic codes, as described in the above-cited book by R. Blahut. If the code parameters are (n, k) with minimum Hamming distance d and with code symbol alphabet $GF(2^m)$, candidate sequences of length mn can be established from a set of size $2^{mn}$. The Hamming radius t of the sphere, or equivalently the error correcting capability of the code, is given by $t \leq [(d-1)/2]$. (The spheres need not be closely packed).

The received sequences $r_A$, $r_B$, and $r_E$ are the inputs to error correction decoders implementing the Berlekamp-Massey procedure. The outputs of the decoders are the sequences $k_A$, $k_B$, and $k_E$. Again, it will be noted that no encrypting need be performed by the transmitters. The decoders substantially limit the number of possible sequences, thereby increasing the likelihood of sequence agreement between the first and second users. It may be noted that decoders might not be needed at very high signal-to-noise ratios (SNRs), although such very high SNRs would be difficult to obtain in a practical communication system.

In many communication systems, an information sequence to be communicated is block-coded for correcting errors. In orthogonal block coding, a number N of information bits are converted to one of $2^N$ N-bit orthogonal codewords. Decoding such an orthogonal codeword involves correlating it with all members of the set of $2^N$ codewords. The binary index of the codeword giving the highest correlation yields the desired information. For example, if the correlations of a received 16-bit codeword with each of the set of sixteen orthogonal 16-bit codewords having indices 0–15 produce the highest correlation on the tenth codeword, the underlying information signal is the 4-bit binary codeword 1010 (which is the integer ten in decimal notation). Such a code is called a [16,4] orthogonal block code. By inverting all of the bits of the codewords, one further bit of information may be conveyed per codeword. This type of coding is known as bi-orthogonal block coding.

A significant feature of such coding is that simultaneous correlation with all the orthogonal block codewords in a set may be performed efficiently by means of a Fast Walsh Transform (FWT) device. In the case of a [128,7] block code, for example, 128 input signal samples are transformed into a 128-point Walsh spectrum in which each point in the spectrum represents the value of the correlation of the input signal samples with one of the codewords in the set. A suitable FWT processor is described in U.S. Pat. No. 5,357, 454 to Dent, which is incorporated here by reference.

PERFORMANCE ANALYSIS

To assess the performance of Applicants' sequence agreement system, it is helpful to assume the following events:

$$G_i = \{\theta_A \in R_i, \theta_B \oplus R_i\}, \ B_i = \{\theta_A \oplus R_i, \theta_E \oplus R_i\}.$$

The probability of a symbol match between the first and second users is given by the following expression:

$$P_g = Pr\left\{ \bigcup_{i=1}^{M} Pr(G_i) \right\} = \sum_{i=1}^{M} [Pr(\Theta_A \in R_i)]^2 \qquad \text{Eq. 13}$$

The probability of a symbol match between the first user and an eavesdropper is given by the following expression:

$$P_b = Pr\left\{ \bigcup_{i=1}^{M} Pr(B_i) \right\} = \frac{1}{M} \qquad \text{Eq. 14}$$

The probability density function of an estimated phase $\theta$ in a decision region can be derived as follows. Initially, assume $\Delta = \theta_1 - \theta_2$ is given and equal to zero. Consider the following:

$$U = 2\Lambda_1\Lambda_2 E + \Lambda_1 N_1 + \Lambda_2 N_2^*$$
$$= X + jY$$
$$X = 2\Lambda_1\Lambda_2 E + Re(\Lambda_1 N_1 + \Lambda_2 N_2^*)$$
$$Y = Im(\Lambda_1 N_1 + \Lambda_2 N_2^*)$$

where, conditioned on $\Lambda_1$ and $\Lambda_2$, $E\{X\} = 2\Lambda_1\Lambda_2 E \triangleq \mu$; $E(Y)=0$; and variance $(X)$=variance $(Y) = 2EN_0(\Lambda_1^2+\Lambda_2^2) \triangleq \sigma_0^2$. The conditional joint probability density function of $X$ and $Y$ is given by the following expression:

$$c = \underbrace{1111111 \ldots 11111}_{l} \underbrace{0000000 \ldots 00000}_{n-l}$$

$$r_a = \underbrace{11 \ldots 11}_{l-j} \underbrace{000 \ldots 00}_{j} \underbrace{111 \ldots 11}_{k} \underbrace{000 \ldots 00}_{n-l-k}$$

$$r_b = \underbrace{1\ldots1}_{l-j-m_1} \underbrace{00\ldots0}_{m_1} \underbrace{11\ldots1}_{m_2} \underbrace{00\ldots0}_{j-m_2} \underbrace{11\ldots1}_{k-m_3} \underbrace{00\ldots0}_{m_3} \underbrace{11\ldots1}_{m_4} \underbrace{00\ldots0}_{n-k-l-m_4}$$

$$P(x,y|\Lambda_1,\Lambda_2) = \frac{1}{2\pi\sigma_0^2} \exp\{-[(x-\mu)^2 + y^2]/2\sigma_0^2\}$$

and with the change of variables:

$$R = \sqrt{X^2 + Y^2}, \text{ and } \theta = \tan^{-1}\frac{Y}{X}$$

the conditional joint density function of $\theta$ and $R$ is given by the following expression:

$$p(r,\theta|\Lambda_1,\Lambda_2) = \frac{r}{2\pi\sigma_0^2} \exp\{-(r^2 + \mu^2 - 2\mu r \cos\theta)/2\sigma_0^2\}$$

Integrating over the interval $r \in [0, \infty]$, it can be shown that the probability density function of $\theta$ is given by:

$$p_\theta(\theta|\Gamma) = \frac{1}{2\pi} \exp(-\Gamma) +$$
$$\frac{1}{\sqrt{2\pi}} (\sqrt{\Gamma} \cos\theta) \exp(-\Gamma \sin^2\theta)[1 - Q(\sqrt{2\Gamma} \cos\theta)]$$

where:

$$\Gamma = \frac{\Lambda_1^2\Lambda_2^2}{\Lambda_1^2 + \Lambda_2^2} \frac{E}{N_0}$$

It can be shown that $\Delta'$ is uniformly distributed over the interval $[-\pi, \pi]$. With regions given by $R_i = [-\pi i/M, \pi i/M]$, for $i=1, \ldots, M$, the desired probability of an estimated phase $\theta$ in a decision region is given by:

$$Pr(\theta \in R_i) = \frac{1}{2\pi} \int_0^\infty \int_{-\pi}^\pi \int_{R_i} p_\Theta(\theta - \delta|\Gamma)P(\Gamma)d\theta\, d\delta\, d\Gamma$$

Now consider the use of a linear block code having minimum Hamming distance d, dimension k, and block length n. Let $t = [(d-1)/2]$ be the number of errors that can be corrected by the decoder. The probability that the sequences established by the first and second users agree is the probability of the two received vectors being in the same decoding region of a codeword.

Let c be a codeword with Hamming weight 1. Three vectors c, $r_A$, and $r_B$ are available. Rearranging the coordinates of these vectors does not change the performance analysis. One such permutation is as follows:

The probability that the sequences agree and that the sequence is c can be shown to be given by:

$$P_l = \sum_{j=0}^{l} \sum_{k=0}^{n-1} \sum_{m_1=0}^{l-j} \sum_{m_2=0}^{j} \sum_{m_3=0}^{k} \sum_{m_4=0}^{n-l-k} \binom{n}{\beta} (1-p_g)^\beta p_g^{n-\beta} \quad \text{Eq. 15}$$

where:

$\beta = m_1 + m_2 + m_3 + m_4$ $0 \leq j + k \leq t$ $0 \leq m_1 + j - m_2 + k - m_3 ° m_4 \leq t$ Thus, the probability of mutual agreement is given by:

$$Pr(k_A = k_B) = \sum_l A_l P_l$$

where $A_l$ is a weight enumerator function of the code. The probability $P_B$ that the sequence established by the eavesdropper agrees is given by a similar equation substituting $P_b$ for $p_g$. Without the use of a decoder, $Pr(k_A=k_B)=Pr(r_A=r_B)=p_g^n$, and $Pr(k_A=k_E)=Pr(r_A=r_E)=1/M^n$.

It is of interest to discuss the tradeoffs involved in such a sequence agreement system. A small value for the dimension k yields a code with good error correcting capability, but as k decreases the speed with which an exhaustive search can be carried increases exponentially. The choice of the code parameters is crucial since the code restricts the size of the candidate sequence space, but the reduction should not yield an insecure system.

For a large number M of decision regions, a larger code can be used, thereby increasing the computational secrecy of the system; also, $P_b$ decreases, which results in a good probabilistic secrecy. This is not sufficient, however, to obtain a good cryptographic system. With increasing M, thermal noise effects become dominant and an increase in $E_b/N_0$ (ratio of bit energy to noise energy) is required to achieve a sequence agreement with certain probabilistic secrecy. Therefore, a tradeoff exists between computational secrecy, probabilistic secrecy, and transmitted energy.

As another example, consider the use of a (31,13) Reed-Solomon code over GF(32). The size of the code (the number of possible codewords, or bit sequences) is $32^{13} = 2^{65}$, and the computational secrecy is substantially better than that of DES $2^{56}$, which is a sequence of a system using the digital encryption standard, consisting of fifty-six secret bits and eight parity bits. The minimum Hamming distance of such a Reed-Solomon code is eighteen.

Figure 9:
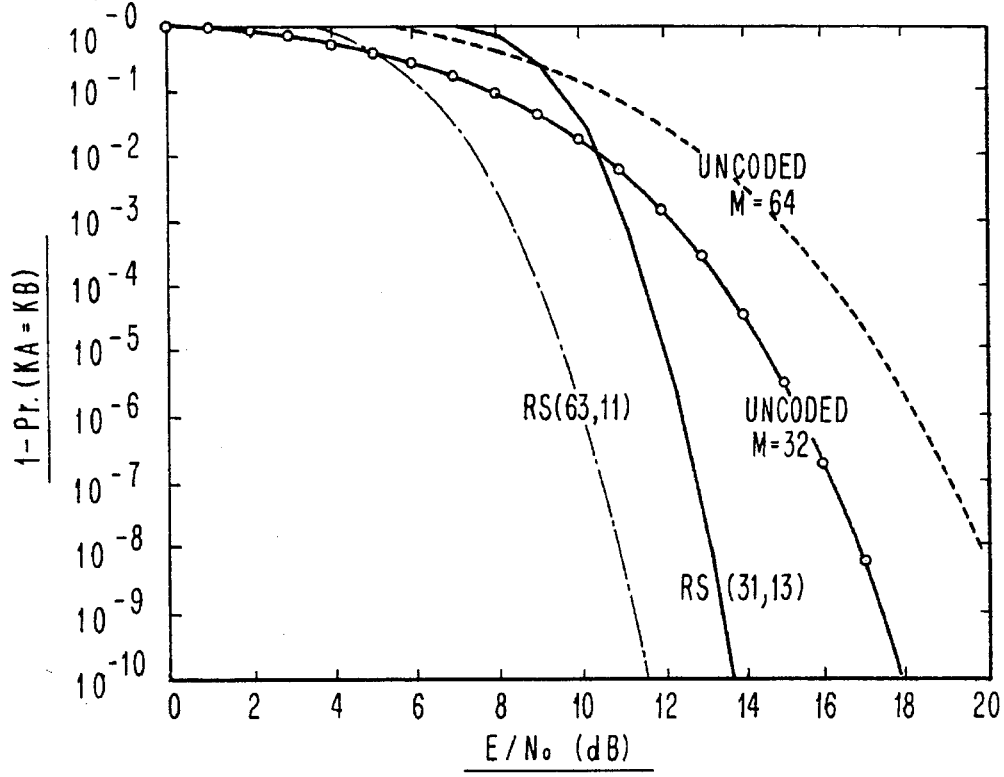
FIG. 9 shows the performance of a communication system in accordance with Applicants' invention.

FIG. 9 shows the performance of a secure communication system that uses such a Reed-Solomon code. Also shown are the performance of a (61,11) Reed-Solomon code and the performances of two uncoded systems. From FIG. 9, it can be seen that, with the use of a channel decoder, the probability that the keys established by the first and second users do not agree is $10^{-8}$ at signal to noise ratios $E_b/N_0$ of 11 dB and 13 dB for M=64 and M=32, respectively. This is a gain of about 9 dB and 4 dB, respectively, compared to a communication system without a decoder. Moreover, $Pr(k_A = k_E) \cong 0$ and $Pr(r_A = r_E) \cong 0$ (both are about $10^{-41}$).

In such a system, the use of a decoder is desirable for the first and second users, although not strictly required as described above, but use of a decoder does not help the eavesdropper. For spreading the information transmitted or despreading the information received, the sequence produced by the decoders can be used as it is, or a binary representation of the whole or part of the sequence can be used. It will be understood that this "spreading" does not refer to the spreading carried out in a CDMA communication system. The key sequences established in accordance with Applicants' invention are generally unsuitable for use as CDMA spreading sequences due to their uncontrolled cross-correlation properties, although Applicants' key sequences can be used for encrypting and decrypting information communicated in a CDMA system.

Applicants' sequence agreement methods and apparatus based on the reversibility of a radio channel provide superior computational secrecy as well as probabilistic secrecy. Using Applicants' invention, long arbitrary key sequences can be shared, and a key sequence can be changed even during a communication "session". In a cellular radio telephone system, it would be desirable to establish a new key sequence at least each time a mobile station registered with the communication system, and even perhaps more frequently, such as for each call or each time a predetermined time interval elapses.

Instead of using a linear block code, a secure communication system could employ combs of 2M orthogonal tones transmitted by each user. Such a comb system has the same performance as a block-code system, but the comb system requires a much larger bandwidth, as required by orthogonal signaling, and a more complex frequency synthesizer for generating the tones.

In either system, the performance measure for security is taken to be probabilistic, and different from the Shannon measure of perfect secrecy. In particular, in the block-code system, the probability of two users' establishing the same secret key sequence is close to one and the probability of an eavesdropper's establishing the same sequence is substantially zero. This is probabilistic secrecy. Also, the number of possible key sequences is large enough that finding the correct sequence by exhaustive search is impractical. This is computational secrecy.

While particular embodiments of Applicants' invention have been described and illustrated, it should be understood that the invention is not limited thereto. This application contemplates any and all modifications that fall within the spirit and scope of Applicant's invention as defined by the following claims.

What is claimed is:

1. A method of establishing a key sequence for secure communication between a first radio transceiver and a second radio transceiver comprising the steps of:

in the first radio transceiver, transmitting a plurality of sinusoidal signals, each sinusoidal signal having a respective predetermined frequency and a predetermined initial phase;

in the second radio transceiver, detecting the plurality of sinusoidal signals transmitted by the first radio transceiver, and transmitting the plurality of sinusoidal signals after a predetermined time period;

in each of the first and second radio transceivers, determining differences between phases of pairs of the plurality of sinusoidal signals received from the other radio transceiver, wherein the sinusoidal signals of each pair are orthogonal;

in each of the first and second radio transceivers, quantizing each difference into a respective one of a plurality of phase decision values; and in each of the first and second radio transceivers, decoding a plurality of the quantized differences into a key sequence according to a predetermined block code.

2. The method of claim 1, further comprising, in each of the first and second radio transceivers, a step of determining a magnitude of each of the plurality of sinusoidal signals, wherein the magnitudes are used in the decoding step as soft information.

3. The method of claim 1, further comprising, in at least one of the first and second radio transceivers, a step of encrypting information to be transmitted according to the key sequence; and in at least the other one of the first and second radio transceivers, the step of decrypting encrypted transmitted information according to the key sequence.

4. The method of claim 3, wherein the encrypting step comprises a step of combining the key sequence and the information to be transmitted in a stream cipher system.

5. The method of claim 3, wherein the encrypting step comprises a step of combining the key sequence and the information to be transmitted in a block-oriented cipher system.

6. A method of establishing a key sequence for secure communication between a first radio transceiver and a second radio transceiver comprising the steps of:

in the first radio transceiver, transmitting a predetermined digital word including a plurality of bits;

in the second radio transceiver, detecting the predetermined digital word transmitted by the first radio transceiver, and transmitting the predetermined digital word after a predetermined time period;

in each of the first and second radio transceivers, hard-decision decoding each of the plurality of bits in the predetermined digital word received from the other radio transceiver; and in each of the first and second radio transceivers, mapping the hard-decision decoded plurality of bits into a key sequence according to a predetermined block code.

7. The method of claim 6, further comprising, in each of the first and second radio transceivers, a step of determining a magnitude of each of the plurality of bits, wherein the magnitudes are used in the mapping step as soil information.

8. The method of claim 6, further comprising, in at least one of the first and second radio transceivers, a step of encrypting information to be transmitted according to the key sequence; and in at least the other one of the first and second radio transceivers, a step of decrypting encrypted transmitted information according to the key sequence.

9. The method of claim 8, wherein the encrypting step comprises a step of combining the key sequence and the information to be transmitted in a stream cipher system.

10. The method of claim 8, wherein the encrypting step comprises a step of combining the key sequence and the information to be transmitted in a block-oriented cipher system.

11. A method of establishing a key sequence for secure communication between a first radio transceiver and a second radio transceiver comprising the steps of:

in the first radio transceiver, transmitting a predetermined digital word including a plurality of bits;

in the second radio transceiver, detecting the predetermined digital word transmitted by the first radio transceiver, and transmitting the predetermined digital word after a predetermined time period;

in each of the first and second radio transceivers, determining a phase of each of the plurality of bits received from the other radio transceiver;

in each of the first and second radio transceivers, determining a difference between each phase determined and a respective predetermined phase;

in each of the first and second radio transceivers, quantizing each difference into a respective one of a plurality of phase decision values; and in each of the first and second radio transceivers, decoding a plurality of the quantized differences into a key sequence according to a predetermined block code.

12. The method of claim 11, further comprising, in each of the first and second radio transceivers, a step of determining a magnitude of each of the plurality of bits, wherein the magnitudes are used in the decoding step as soft information.

13. The method of claim 11, further comprising, in at least one of the first and second radio transceivers, a step of encrypting information to be transmitted according to the key sequence; and in at least the other one of the first and second radio transceivers, a step of decrypting encrypted transmitted information according to the key sequence.

14. The method of claim 13, wherein the encrypting step comprises a step of combining the key sequence and the information to be transmitted in a stream cipher system.

15. The method of claim 13, wherein the encrypting step comprises a step of combining the key sequence and the information to be transmitted in a block-oriented cipher system.

16. An apparatus for establishing a key sequence for secure communication between a first radio transceiver and a second radio transceiver comprising:

in the first radio transceiver, means for transmitting a plurality of sinusoidal signals, each sinusoidal signal having a respective predetermined frequency and a predetermined initial phase;

in the second radio transceiver, means for detecting the plurality of sinusoidal signals transmitted by the first radio transceiver, and for transmitting the plurality of sinusoidal signals at a predetermined time after the beginning is detected;

in each of the first and second radio transceivers, means for determining differences between phases of pairs of the plurality of sinusoidal signals received from the other transceiver, wherein the sinusoidal signals of each pair are orthogonal;

in each of the first and second radio transceivers, means for quantizing each difference into a respective one of a plurality of phase decision values; and in each of the first and second radio transceivers, means for decoding a plurality of the quantized differences into a key sequence according to a predetermined block code.

17. The apparatus of claim 16, further comprising, in each of the first and second radio transceivers, means for determining a magnitude of each of the plurality of sinusoidal signals, wherein the magnitudes are used by the decoding means as soft information.

18. The apparatus of claim 16, further comprising, in at least one of the first and second radio transceivers, means for encrypting information to be transmitted according to the key sequence; and in at least the other one of the first and second radio transceivers, means for decrypting encrypted transmitted information according to the key sequence.

19. The apparatus of claim 18, wherein the encrypting means combines the key sequence and the information to be transmitted in a stream cipher system.

20. The apparatus of claim 18, wherein the encrypting means combines the key sequence and the information to be transmitted in a block-oriented cipher system.

21. An apparatus for establishing a key sequence for secure communication between a first radio transceiver and a second radio transceiver comprising:

in the first radio transceiver, means for transmitting a predetermined digital word including a plurality of bits;

in the second radio transceiver, means for detecting the predetermined digital word transmitted by the first radio transceiver, and for transmitting the predetermined digital word after a predetermined time period;

in each of the first and second radio transceivers, means for hard-decision decoding each of the plurality of bits in the predetermined digital word received from the other radio transceiver; and in each of the first and second radio transceivers, means for mapping the hard-decision decoded plurality of bits into a key sequence according to a predetermined block code.

22. The apparatus of claim 21, further comprising, in each of the first and second radio transceivers, means for determining a magnitude of each of the plurality of bits, wherein the magnitudes are used by the mapping means as soft information.

23. The apparatus of claim 21, further comprising, in at least one of the first and second transceivers, means for encrypting information to be transmitted according to the key sequence; and in at least the other one of the first and second transceivers, means for decrypting encrypted transmitted information according to the key sequence.

24. The apparatus of claim 23, wherein the encrypting means combines the key sequence and the information to be transmitted in a stream cipher system.

25. The apparatus of claim 23, wherein the encrypting means combines the key sequence and the information to be transmitted in a block-oriented cipher system.

26. An apparatus for establishing a key sequence for secure communication between a first radio transceiver and a second radio transceiver comprising:

in the first radio transceiver, means for transmitting a predetermined digital word including a plurality of bits;

in the second radio transceiver, means for detecting the predetermined digital word transmitted by the first radio transceiver, and for transmitting the predetermined digital word after a predetermined time period;

in each of the first and second radio transceivers, means for determining a phase of each of the plurality of bits received from the other radio transceiver;

in each of the first and second radio transceivers, means for determining a difference between each phase determined and a respective predetermined phase;

in each of the first and second radio transceivers, means for quantizing each difference into a respective one of a plurality of phase decision values; and in each of the first and second radio transceivers, means for decoding a plurality of the quantized differences into a key sequence according to a predetermined block code.

27. The apparatus of claim 26, further comprising, in each of the first and second radio transceivers, means for determining a magnitude of each of the plurality of bits, wherein the magnitudes are used by the decoding means as soft information.

28. The apparatus of claim 26, further comprising, in at least one of the first and second transceivers, means for encrypting information to be transmitted according to the key sequence; and in at least the other one of the first and second transceivers, means for decrypting encrypted transmitted information according to the key sequence.

29. The apparatus of claim 28, wherein the encrypting means combines the key sequence and the information to be transmitted in a stream cipher system.

30. The apparatus of claim 28, wherein the encrypting means combines the key sequence and the information to be transmitted in a block-oriented cipher system.

* * * * *